March 25, 1958  H. V. JOHNSON ET AL  2,828,162
FURNACE-ELECTRODE JOINT
Filed Sept. 11, 1953

INVENTORS
HARRY V. JOHNSON
NEAL J. JOHNSON
BY
ATTORNEY

United States Patent Office 2,828,162
Patented Mar. 25, 1958

2,828,162

FURNACE-ELECTRODE JOINT

Harry V. Johnson and Neal J. Johnson, Niagara Falls, N. Y., assignors to Union Carbide Corporation, a corporation of New York Application September 11, 1953, Serial No. 379,566

7 Claims. (Cl. 287—127)

This invention relates to a pair of furnace electrode sections connected by a threaded nipple bonded to each electrode by a cementitious material to prevent relative rotation between the nipple and each electrode section. In such pairs of electrode sections, there has been a tendency for at least one of the electrode sections to fracture adjacent the nipple or the nipple itself fractures from some one or more of a variety of causes. For example, a shifting of scrap within a furnace before it has melted, or the swinging of the furnace roof, or the tilting of the furnace, or some one or several of these causes may tend to flex the connected electrodes. It has been found that a pair of connected electrode sections needs to possess at least slight flexibility to withstand the shock due to some one or more of the foregoing causes.

An object of this invention is to enhance the yieldability or flexibility of a pair of nipple-connected electrode sections. Another object is to reduce the tendency of such electrode sections to fracture in use. A further object is to facilitate the ease with which a threaded nipple may be connected, making it unnecessary to consider which end has to be the upper and which the lower end of the nipple.

According to this invention, it has been discovered that by sacrificing a slight amount of electrical conductivity at the nipple threads in the construction of Johnson et al. 2,510,230, a connection less likely to rupture and one more yieldable can be produced. Specifically, this has been accomplished by reducing the threaded area in contact with a cementitious conductive bond to not more than about 25% of the threaded area previously bonded as disclosed in the patent to Johnson et al., No. 2,510,230. This makes the connected joint slightly more yieldable and less likely to fracture. The exact reasons are not certain. Best results have been obtained when the conductive bond at the nipple threads is about equally divided and adjacent each end of the nipple. A pitch reservoir for the bonding material is located to be adjacent each end of the nipple. According to whether this reservoir extends through one or both ends of the nipple, one or two caps close the end or ends of the reservoir to enable the nipple to be reversible, i. e. either end placed above the other.

Figure 1:
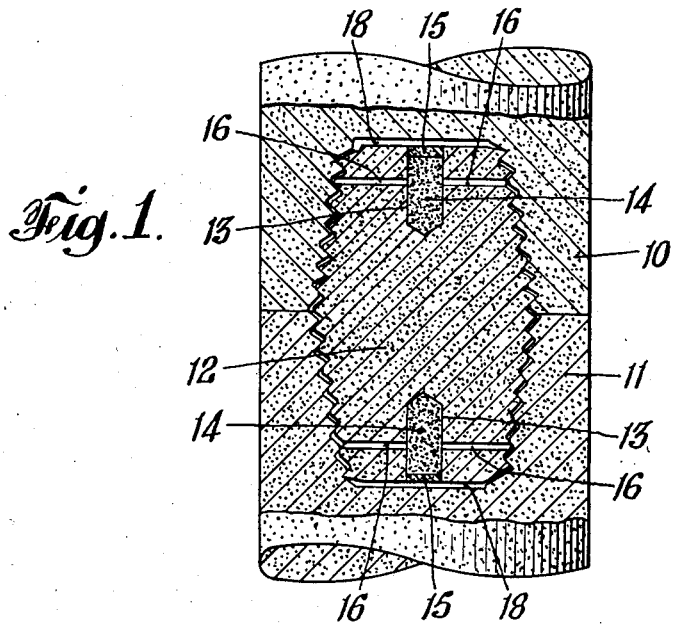
Figures 2, 3:
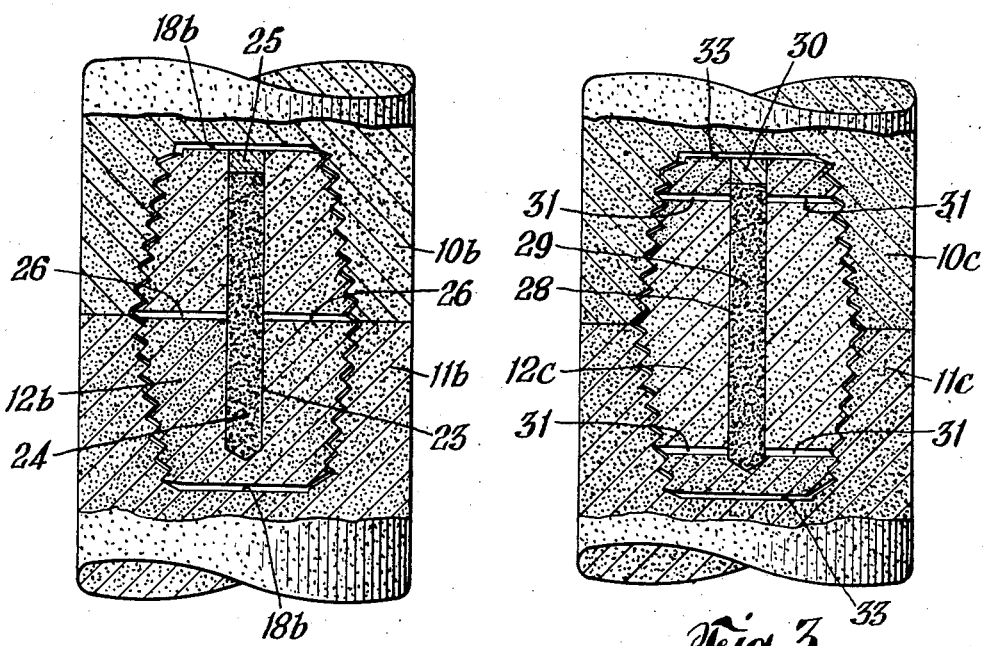

Referring to the drawings, Fig. 1 is a cross-sectional view of a preferred embodiment of this invention with the nipple in place but before the bonding material has been heated. Fig. 2 is a cross-sectional view of an electrode joint in which the bonding material is provided only for central threads. Fig. 3 is a view somewhat similar to that of Fig. 1 but with the reservoir of bonding material extending almost entirely through the nipple.

In Fig. 1, which is a preferred embodiment of this invention, two furnace electrode sections 10 and 11 are connected by a threaded nipple 12 in the customary manner. Instead of having the cementitious pitch bonding material of Johnson et al., Patent No. 2,510,230, dated June 6, 1950, for "Electrode Joint," in which a large portion of the threaded surfaces were bonded, it has been discovered that by sacrificing a small amount of conductivity in the joint, more flexibility and, therefore, a longer-lived connection between the electrode sections is now possible. Reservoirs 13 for pitch 14 which corresponds to the pitch of the afore-mentioned prior patent are provided at each end of the nipple. Each such reservoir is filled with the pitch 14 but, unlike the pitch reservoirs of the aforesaid patented construction, these reservoirs 13 are each provided with a cap 15 to prevent the pitch when heated from flowing out the ends of the reservoirs and instead causing the pitch to flow both by gravity, foaming and expansion, out through channels 16. Thus, on heating the pitch 14, it seeps between contacting surfaces of a thread and flows along the clearance space of adjacent threads where it may flow laterally in each direction. Also, some of the heated pitch may flow into a portion of a clearance space 18 at each end of the nipple. The nipple illustrated in Fig. 1 is thus reversible and it makes no difference which end is uppermost since the pitch will flow and fill the desired threaded area of each electrode and bond each electrode section against relative rotation with respect to the nipple. The embodiment illustrated in Fig. 1 shows the construction before the particles of coal-tar pitch have been heated. After they have been heated as just described, they fill the channels 16 and possibly a portion of the clearance space 18.

In Fig. 2, electrode sections 10b and 11b are connected by a nipple 12b having a longitudinal and axial reservoir 23 extending throughout a major portion of the length of the nipple. Pitch particles 24 similar to the pitch 14 fill the reservoir 23 before it is heated and a cap 25 is provided at the open end of the reservoir 23. After heating, the pitch 24 flows through opposite channels 26 for bonding the nipple to each of the electrode sections in the above-described manner through only 1 or 2 of the threads each side of its center. In this construction, like that in Fig. 1, only about 10% to 25% of the threaded area of the nipple is bonded to the electrode sections.

In Fig. 3 is shown another embodiment of this invention in which electrode sections 10c and 11c are joined by a nipple 12c having an axial reservoir 28 extending throughout nearly the full length of the nipple for receiving pitch particles 29. The upper end of the reservoir 28 is closed by a cap 30 for the purpose of enabling the nipple to be connected with either end at the top or bottom. In this embodiment, on being heated, the pitch 29 flows through opposite channels 31 at each end of the nipple into the thread clearance and possibly into a portion of a clearance space 33 between each end of the nipple and its electrode section. This embodiment is not as flexible as is the preferred embodiment in Fig. 1 because more of the clearance spaces at one or both ends of the nipple become filled with the bonding material. Under some conditions, the pitch may not reach the top channel 31 before it is all used in the bottom.

Among the advantages of this invention may be mentioned the fact that the reduction in the amount of bonding material engaging the threaded surfaces of the nipple has been discovered to be satisfactorily effective in electrical conductivity yet more desirable than the bond shown in said prior Patent No. 2,510,230 because this reduction in the amount of bonding material enables the two electrode sections to be slightly more yieldable or flexible and thus less likely to break off or the nipple to break before they have been entirely consumed. Such breaks occur due to mechanical shocks before cracking of the sockets due to thermal effects become serious. Some idea of the degree of improvement attainable by this invention may be appreciated when it is stated that the fully cemented joint described in the prior Patent No. 2,510,230 has been found to be only about 60% as flexible as the same joint would be without the bonding material being present. In the present invention, the flexibility has been increased until the connected electrodes are able to be 80% to 100% as flexible as the uncemented joint. Thus, this invention possesses an improvement in flexibility of about 33% to 67% of the flexibility of the fully cemented joint of said patent. Another advantage of this invention resides in the reversibility of the nipple which may be more easily and quickly attached by a workman without his having to stop and check to be sure which end is intended to be at the top. The reason why the embodiment shown in Fig. 1, which is the preferred embodiment of the invention, is more flexible than the other two embodiments, cannot be stated with certainty, but it is believed that with only the short amount of bonded threaded area, less than 25% and preferably at least 10% or more, the bonding material after it has set still possesses a slight degree of flexibility and compressibility. In Fig. 2, the flexibility of the bond permits slight angular displacement of the nipple in each electrode section, but an amount which is limited by the short length of half the length of the nipple. In Fig. 1, on the other hand, with the bond located at each end of the nipple, the length of the nipple portion available for slight angular displacement is more nearly the full length of the nipple. In joints undergoing bending movement, the threads near the meeting faces of the electrode sections, hereinafter called an interface, tend to slip on each other and there is evidence of actual separation of the threads on the tension side. Cementing near the interface obstructs this freedom of movement whereas cementing near the ends of the nipple does not obstruct this freedom. In the embodiment illustrated in Fig. 2, provision may be made if desired for the bonding material to flow radially outward into the interface of the connected electrode sections for the purpose of enhancing the electrical conductivity at this location, in accordance with the disclosure in the copending application of H. V. Johnson, Serial No. 300,243, filed July 22, 1952, for "Electrode Joint" (now abandoned). In this last event, in case of flexure between the electrode sections, the portion of the bonded interface that is under tension may rupture without causing a fracture in the portion of the bond which is under compression.

We claim:

1. In a connection between two electrode sections, a threaded nipple mechanically uniting the two electrode sections, and a cementitious bond between said nipple and a threaded portion of each electrode whereby said electrode is held from relative rotation with respect to said nipple, the improvement comprising a cementitious bond in preselected areas of the total threaded surface, said preselected areas comprising about 10% to 25% of the total threaded surface, whereby the hazard of breakage due to flexure is substantially minimized, said nipple containing at least one reservoir for a cementitious pitch, at least one supply channel from said reservoir to an external threaded portion of said nipple for supplying heated pitch to the nipple threaded irrespective of which end of said nipple is uppermost, and a cap closing an end portion of said nipple reservoir in order to prevent loss of said pitch when said cap end of the nipple is lowermost.

2. A threaded nipple by means of which a pair of furnace electrode sections may be connected, said nipple having a reservoir adjacent each end, an electrically conductive cementitious bonding material located in each of said reservoirs, and said nipple having at least one channel in communication with each of said reservoirs and terminating respectively at the threaded surfaces adjacent said ends.

3. A nipple according to claim 2 in which the reservoir adjacent each end of said nipple is substantially axially connected to form a single reservoir.

4. A nipple according to claim 2 in which a cap is provided across said reservoir at one end to retain the bonding material therein in event said one end of said nipple becomes inverted.

5. A nipple according to claim 2 in which a cap closes the reservoir at each end of said nipple to retain the bonding material therein prior to its being set and irrespective of which end of the nipple may be lower.

6. A reversible threaded nipple constituting an electrical and mechanical connection for two sections of a furnace electrode, said nipple being provided adjacent each end with a reservoir, a cementitious bonding pitch in each of said reservoirs, and said nipple having adjacent each end a passageway in communication with said adjacent reservoir and through which passageway the pitch may flow radially outward to an outer threaded surface of the adjacent end of the nipple, the total amount of pitch in said reservoirs being such as to fill a maximum of about 25% of the threaded surface of said nipple.

7. A reversible threaded nipple by means of which two sections of a furnace electrode may be connected, said nipple having in each end a recess, said recess being provided with a thermal-setting bonding material and at least one transverse passageway by means of which the bonding material when melted may flow radially outward into clearance spaces around the nipple threads when the nipple connects two electrode sections, the quantity of bonding material in said nipple being enough when melted and thermally set to hold said sections against becoming unscrewed from said nipple and to fill not more than about 25% of such clearance spaces adjacent each end of the nipple.

References Cited in the file of this patent

UNITED STATES PATENTS

| | | |
|---|---|---|
| 1,743,888 | Hamister | Jan. 14, 1930 |
| 2,510,230 | Johnson et al. | June 6, 1950 |
| 2,527,294 | Bailey | Oct. 24, 1950 |
| 2,735,705 | Johnson et al. | Feb. 21, 1956 |